US009733941B2

(12) United States Patent
Hurd

(10) Patent No.: US 9,733,941 B2
(45) Date of Patent: Aug. 15, 2017

(54) TECHNIQUE FOR TRANSLATING DEPENDENT INSTRUCTIONS

(71) Applicant: Advanced Micro Devices, Inc., Sunnyvale, CA (US)

(72) Inventor: Kevin A. Hurd, Fort Collins, CO (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 1246 days.

(21) Appl. No.: 13/648,007

(22) Filed: Oct. 9, 2012

(65) Prior Publication Data
US 2014/0101414 A1 Apr. 10, 2014

(51) Int. Cl.
*G06F 9/30* (2006.01)
*G06F 9/38* (2006.01)
*G06F 9/00* (2006.01)

(52) U.S. Cl.
CPC .......... *G06F 9/3017* (2013.01); *G06F 9/384* (2013.01)

(58) Field of Classification Search
None
See application file for complete search history.

(56) References Cited

U.S. PATENT DOCUMENTS

2012/0260068 A1* 10/2012 Henry ................. G06F 9/30072
712/200

* cited by examiner

*Primary Examiner* — Scott Sun

(57) ABSTRACT

In response to determining an operation is a dependent operation, a mapper of a processor determines the source registers of the operation from which the dependent operation depends. The mapper translates the dependent operation to a new operation that uses as its source operands at least one of the determined source registers and a source register of the dependent operation. The new operation is independent of other pending operations and therefore can be executed without waiting for execution of other operations, thus reducing execution latency.

13 Claims, 5 Drawing Sheets

TECHNIQUE FOR TRANSLATING DEPENDENT INSTRUCTIONS

BACKGROUND

Field of the Disclosure

The present disclosure generally relates to processors, and more particularly to processing of dependent instructions at a processor.

Description of the Related Art

Processors sometimes enhance processing efficiency by employing out-of-order execution, whereby instructions are executed in an order different from the instructions' program order. In order to avoid errors, a processor executing instructions out of order uses disambiguation techniques to account for dependencies between instructions. One such disambiguation technique is the use of a scheduler to ensure that a dependent instruction is not executed until after execution of the instruction from which it depends. However, this technique can increase the execution latency of the dependent instruction, thereby reducing the efficiency of the processor.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-5 illustrate techniques for reducing the execution latency of an instruction at a processor by translating (mapping) a dependent operation of the instruction so that the operation is no longer dependent. In some embodiments, to translate an operation, a mapper of the processor determines the source registers of the operation from which the dependent operation depends. The mapper translates the dependent operation to a new operation that uses as its source operands at least one of the determined source registers and a source register of the dependent operation. The new operation achieves the same result as the dependent operation but is independent of other pending operations and therefore can be executed without waiting for execution of the other the operation it was initially dependent on, thus allowing reduced execution latency.

To illustrate by way of example, the mapper can determine that Operation B is an ADD operation that adds two addends: the result of Operation A, also an ADD instruction, and another addend. Accordingly, Operation B uses as its source registers the destination register of Operation A and a source register storing the other addend. The mapper therefore translates Operation B into a new instruction that adds three addends: the two addends stored at the source registers of Operation A and the independent addend. The new instruction is not dependent on Operation A and can therefore be executed before or in parallel with Operation A. Accordingly, the result of Operation B is achieved with less latency than awaiting execution of Operation A.

Figure 1:
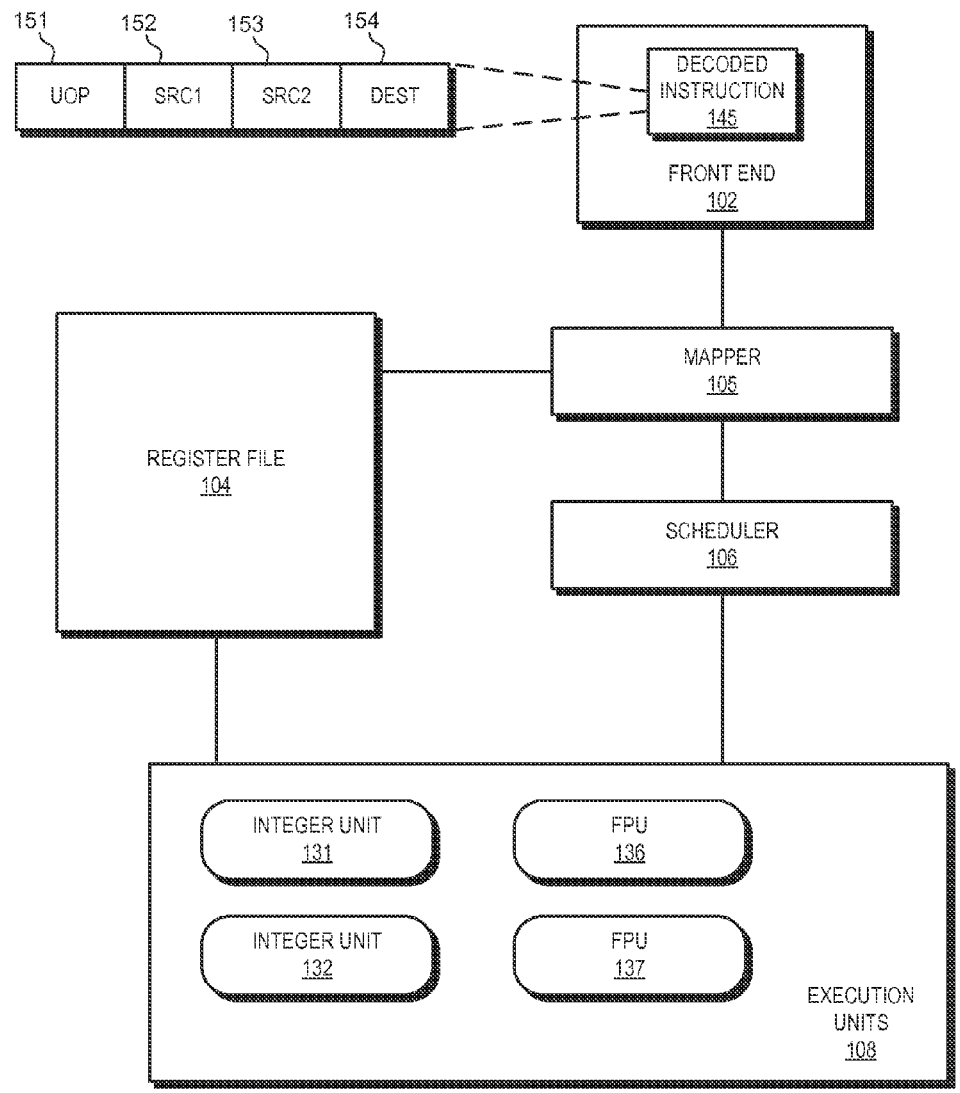
FIG. 1 is a block diagram of a processor in accordance with some embodiments.

FIG. 1 illustrates a block diagram of a processor 100 in accordance with some embodiments. The processor 100 can be incorporated into any system or electronic device that employs a processor to execute sets of instructions, including a personal computer, server, tablet, cell phone or other telephone, game console, and the like. The sets of instructions executed by the processor 100 are arranged as computer programs stored at a memory (not shown). Each of the computer programs defines a corresponding order, referred to as the program order, of its set of instructions. As described further herein the processor 100 is configured to execute at least a subset of the operations mandated by the instructions in an out-of-order fashion with respect to the program order, but is configured to take steps to ensure that the results of the out-of-order execution matches the results if the operations were executed in program order.

To execute the instructions, the processor 100 includes an instruction pipeline having a front end 102, a mapper 105, a register file 104, a scheduler 106, and execution units 108. The front end 102 is configured to retrieve the sets of instructions from the memory and to decode each instruction into one or more operations. When the operations of an instruction are executed, the task associated with the instruction is achieved. An instruction thus provides a level of abstraction for its associated operations. To illustrate, an instruction to add a number to a variable can be decoded into at least three operations: an operation to load the variable value to one register, an operation to load the number to another register, and an operation to add the contents of the registers. An example operation 145 is illustrated at FIG. 1. The operation 145 includes a micro-operation (uOp) field 151, source register fields 152 and 153, and a destination register field 154. It will be appreciated that different instructions can be decoded such that they have different combinations of the illustrated fields. For example, some instructions will have fewer or more than two source register fields.

The uOp field 151 stores a code (e.g., an opcode) indicating the micro-operation associated with the instruction. The code therefore indicates the particular operation that is to be executed for the operation 145. For example, the code can indicate whether the operation is to execute an integer addition operation, a floating point multiply operation, a load/store operation, and the like. The source register fields 152 and 153 indicate architectural registers where source operands for the operation to be executed are located and the destination register field 154 indicates an architectural register where the result of the operation is to be stored. To illustrate, in some embodiments, the sets of instructions executed at the processor 100 are configured to operate on an architectural register space having a plurality of architectural registers. The registers indicate locations in the architectural register space. As described further herein, the processor 100 maps the architectural registers to a set of physical registers at the register file 104, whereby the physical register mapped to a given architectural register can change according to conditions at the instruction pipeline. The architectural register space provides, for the executing set of instruction, a common set of referents as to the locations of operands independent of the particular hardware of the processor 100. To illustrate by way of example, an integer add instruction can be decoded to have source operands representing two corresponding addends. The source register fields 152 and 153 indicate the architectural registers that store the addends and the destination register field 154 indicates the architectural register where the sum of the addends is stored in response to execution of the instruction.

The source fields 152 and 153 and destination field 154 of operations are used to identify dependency between operations. In particular, as used herein, Operation B is dependent on Operation A if Operation B is later in the program order than. Operation A and a source operand of Operation B matches the destination operand of Operation A, and there is no intervening operation that writes the architectural register that is the destination of Operation A, Operation B is independent of Operation A if 1) Operation B is prior to Operation A in the program order; 2) Operation B does not have a source operand that matches a destination operand of Operation A; or 3) there is an operation between Operation A and Operation B in the program order that writes the architectural register that is the destination of Operation A. Conventionally, dependent operations are executed in program order relative to, the operation from which they depend in order to avoid errors. However, as described further herein, the processor 100 can translate selected decoded dependent instructions to new operations and thereby remove the dependency, allowing out-of-order execution for the new operations.

The mapper 105 is configured to receive operations and to map the architectural registers indicated by the operands of the operations to physical registers at the register file 104. The mapper 105 maintains a table (map) that indicates which of the physical registers at the register file 104 is assigned to each architectural register. The mapper 105 updates the table based on dependencies between instructions and on the state of execution of operations pending at the instruction pipeline to allow for out-of-order execution of independent instructions. In addition, the mapper 105 can translate selected operations into new operations in response to determining the selected operations are dependent on another operation that has not yet completed execution. The new operations achieve the same result as the corresponding selected operations, but use the source operands rather than the destination operand, of the operation from which they depend. The new operation is therefore independent and can be executed in an out-of-order fashion relative to a program order.

To illustrate by way of example, Operation B is an integer add operation having a destination operand R5 and source operands R3 and R4, where R3, R4 and R5 indicate different architectural registers. Operation A precedes Operation 13 in the program order and is an integer add operation having a destination operand R3 and source operands R1 and R2. Operation A and Operation B can be operations resulting from decoding of a single instruction or operations decoded from different instructions. For purposes of the example, there are no instructions between Operation A and Operation B in the program order that write architectural register R3. Thus, because one of the source operands of Operation B is the destination operand of Operation A, Operation B depends on Operation A. In response to determining this dependency, the mapper 105 translates the Operation 513 into a new Operation C, where Operation C is an integer add operation that adds 3 source operands R1, R2, and R4, and has a destination operand of R5, Accordingly, Operation C achieves the same result as Operation B, However, the source operands of Operation C do not include the destination operand of Operation A. Accordingly, Operation C is independent of Operation A. Operation C can therefore be executed before or concurrently with Operation A increasing processing efficiency.

In some embodiments, the mapper 105 processes several operations in parallel to support out of order execution. In the course of mapping the architectural register operands of the operations to physical registers, the mapper 105 determines dependencies between the operations being processed. For selected ones of operations that are determined to be dependent, the mapper 105 can translate operations as described further herein.

In some embodiments, the mapper 105 includes a set of tables to facilitate translation of an operation. One of the tables maintains operation information for received operations that have not yet completed execution. The other table is a table of micro-operations that indicates 1) which micro-operations are candidates for translation and 2) the corresponding micro-operation to which the candidate is to be translated if the received operation is a dependent instruction. For each received operation, the mapper 105 compares the operation's source operands to the destination operands of the pending decoded operations and concurrently compares the micro-operation of the received operation to the table. In response to the comparison indicating that the received operation is 1) a candidate for translation and 2) is dependent on a pending operation, the mapper 105 translates the received operation by substituting the received micro-operation with the micro-operation indicated by the table. The mapper 105 also substitutes at least one of the source operands of the received operation with a source operand of the operation from which it depends. In addition, the mapper 105 can insert any other source operands of the operation from which it depends as additional source operands of the received operation thereby translating the received operation into a new operation whose result matches the received operation.

The scheduler 106 receives operations from the mapper 105 and schedules the operations for execution at the execution units 108. In addition, the scheduler 106 determines dependencies between the instructions based on the physical, rather than the architectural registers. The scheduler 106 then schedules the operations for execution such that dependent instructions are executed according to the program order relative to the instructions from which they depend. That is, the scheduler 106 schedules the operations for execution to ensure that dependent instructions are executed after the instructions from which they depend.

As discussed above, the new instructions generated at the mapper 105 described above are no longer dependent on the instructions from which their "parent" instruction depended. Accordingly, the new instruction can be executed before or concurrently with the instruction from which the parent instruction depended. To illustrate, in the depicted example of FIG. 1 the execution units 108 include two integer units, designated integer units 131 and 132, and two floating point units (FPUs), designated FPUs 136 and 137. Using the example above, integer add Instruction B depends from integer add Instruction A. Accordingly, without translation of Instruction B the scheduler 106 would determine that Instruction B depends on Instruction A and would therefore schedule the instructions such that, for example, Instruction A must complete execution at integer unit 131 before Instruction B can be scheduled for execution at one of integer unit 131 and integer unit 132. However, in the example above operation B is translated to operation C. The scheduler 106 determines that Instruction C is independent of Instruction A, and therefore schedules operation A and operation C for concurrent execution at the integer unit 131 and the integer unit 132, respectively. Thus, the result of Instruction B is determined more quickly than without translation, thereby reducing latency and improving performance.

Figure 2:
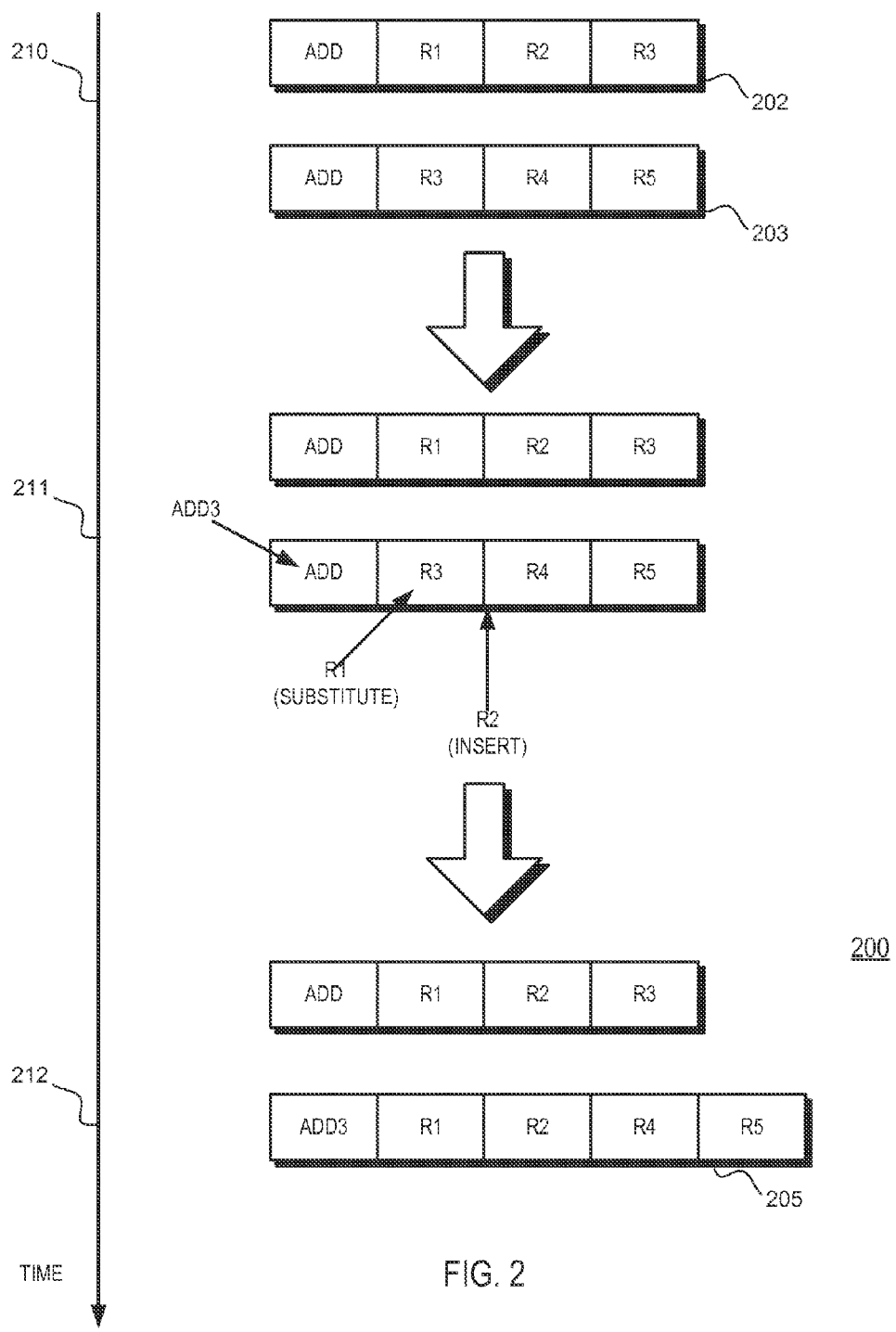
FIG. 2 is a diagram illustrating a timeline showing an example operation of a mapper of the processor of FIG. 1 in accordance with some embodiments.

FIG. 2 depicts a timeline 200 illustrating an example operation of the mapper 105 of the processor 100 of FIG. 1 in accordance with some embodiments. In particular, the timeline 200 illustrates the translation of an operation 203 based on its dependency on an operation 202 that precedes the operation 203 in the program order. The operation 202 performs an integer addition of two source operands, designated R1 and R2, and stores the result at a destination operand designated R3. The operation 203 performs an integer addition the source operand R3 to a source operand designated R4 and stores the result at the destination operand R5. Accordingly, the result of the operation 203 can be expressed as follows:

$$R5=R3+R4=(R1+R2)+R4$$

At time 210, the mapper 105 receives the operation 203. In response, the mapper 105 compares the source operands of operation 203 to the destination operand of operation 202 and determines a match, indicating that the operation 203 is dependent on the operation 202. In addition, the mapper 105 concurrently compares the micro-operations of the operation 202 and 203 and determines that they are both integer add instructions that add two corresponding source operands. The mapper 105 therefore determines that the operation 203 is eligible for translation. In response, at time 211 the mapper 105 translates the operation 203 by replacing its micro-operation with the micro-operation ADD3, which is configured to perform an integer addition of three source operands. In addition, the mapper 105 replaces the source operand of the operation 203 that matches the destination operand of the operation 202 (the operand R3) with one of the source operands (R1) of the operation 202. The mapper 105 also adds the other source operand (R2) of the operation 202 as an additional operand for the translated instruction. Accordingly, at time 212 the mapper 105 provides a new, translated operation 205. The operation 205 adds the source operands of the operation 202 R1 and R2 to the source operand R4 of the operation 203 and stores the result at the destination operand R5. Accordingly, the result of the operation 205 can be expressed as follows:

$$R5=R1+R2+R4$$

Thus, the result of the operation 205 matches the result of the operation 203. However, the operation 205 does not use the destination operand of the operation 202, and therefore is not dependent on the operation 202. The operation 205 can therefore be executed prior to or concurrent with the operation 202.

Figure 3:
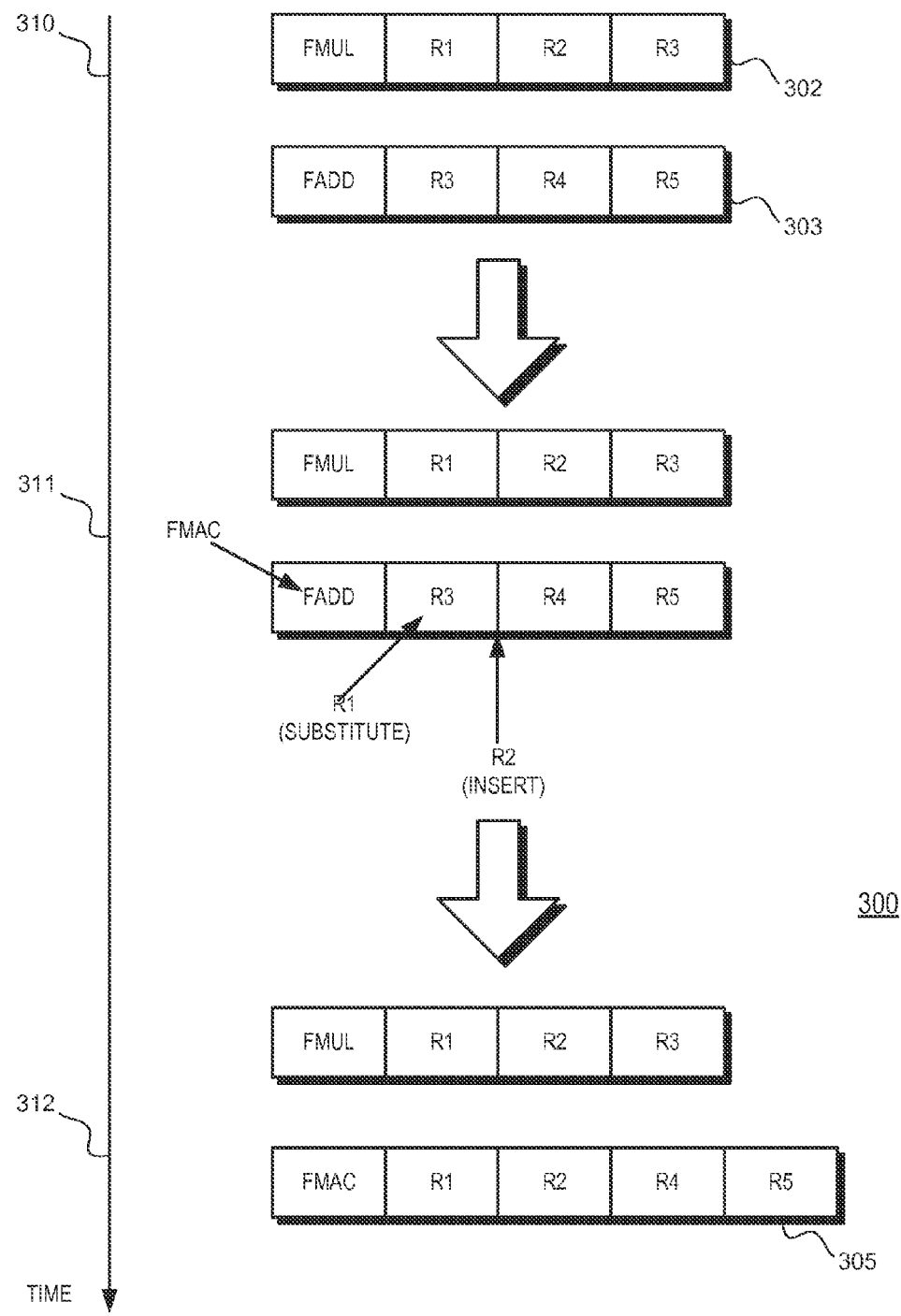
FIG. 3 is a diagram illustrating a timeline showing another example operation of the mapper of the processor of FIG. 1 in accordance with some embodiments.

FIG. 3 depicts a timeline 300 illustrating another example operation of the mapper 105 in accordance with some embodiments. In particular, the timeline 300 illustrates the translation of an operation 303 based on its dependency on an operation 302 that precedes the operation 303 in the program order. The operation 302 performs a floating point multiply of two source operands, designated R1 and R2, and stores the result at a destination operand designated R3. The operation 303 performs a floating point addition of the source operand R3 to a source operand designated R4 and stores the result at the destination operand R5. Accordingly, the result of the operation 303 can be expressed as follows:

$$R5=R3+R4=(R1*R2)+R4$$

At time 310, the mapper 105 receives the operation 303. In response, the mapper 105 compares the source operands of operation 303 to the destination operand of operation 302 and determines a match, indicating that the operation 303 is dependent on the operation 302. In addition, the mapper 105 concurrently compares the micro-operations of the operation 302 and 303 and determines that the operation 303 is eligible for translation. In response, at time 311 the mapper 105 translates the operation 303 by replacing its micro-operation with the micro-operation FMAC, which is configured to perform a floating point multiply-accumulate operation that multiplies two source operands and adds the result to a third source operand three source operands. The mapper 105 replaces the source operand of the operation 203 that matches the destination operand of the operation 302 (the operand R3) with one of the source operands (R1) of the operation 302. The mapper 105 also adds the other source operand (R2) of the operation 302 as an additional operand for the translated instruction. Accordingly, at time 312 the mapper 105 provides a new, translated operation 305. The operation 305 multiplies the source operands of the operation 302 R1 and R2 and adds the result to the source operand R4 of the operation 303. The operation 305 stores the result at the destination operand R5. Accordingly, the result of the operation 305 can be expressed as follows:

$$R5=R1*R2+R4$$

Thus, the result of the operation 305 matches the result of the operation 303. However, the operation 305 does not use the destination operand of the operation 302, and therefore is not dependent on the operation 302. The operation 305 can therefore be executed prior to or concurrent with the operation 302.

Other operations in addition to the above examples can also be translated. For example, some operations invoke a logical operation, such as an OR or AND operation, where the logical operation combines an operand with the resulting operand of an addition operation. The logical operation is therefore dependent on the addition operation. The logical operation can be translated to a new operation that adds the operands of the addition operation and performs the logical operation on the result. The new operation is therefore independent of the addition operation, but achieves the same result as the logical operation.

Figure 4:
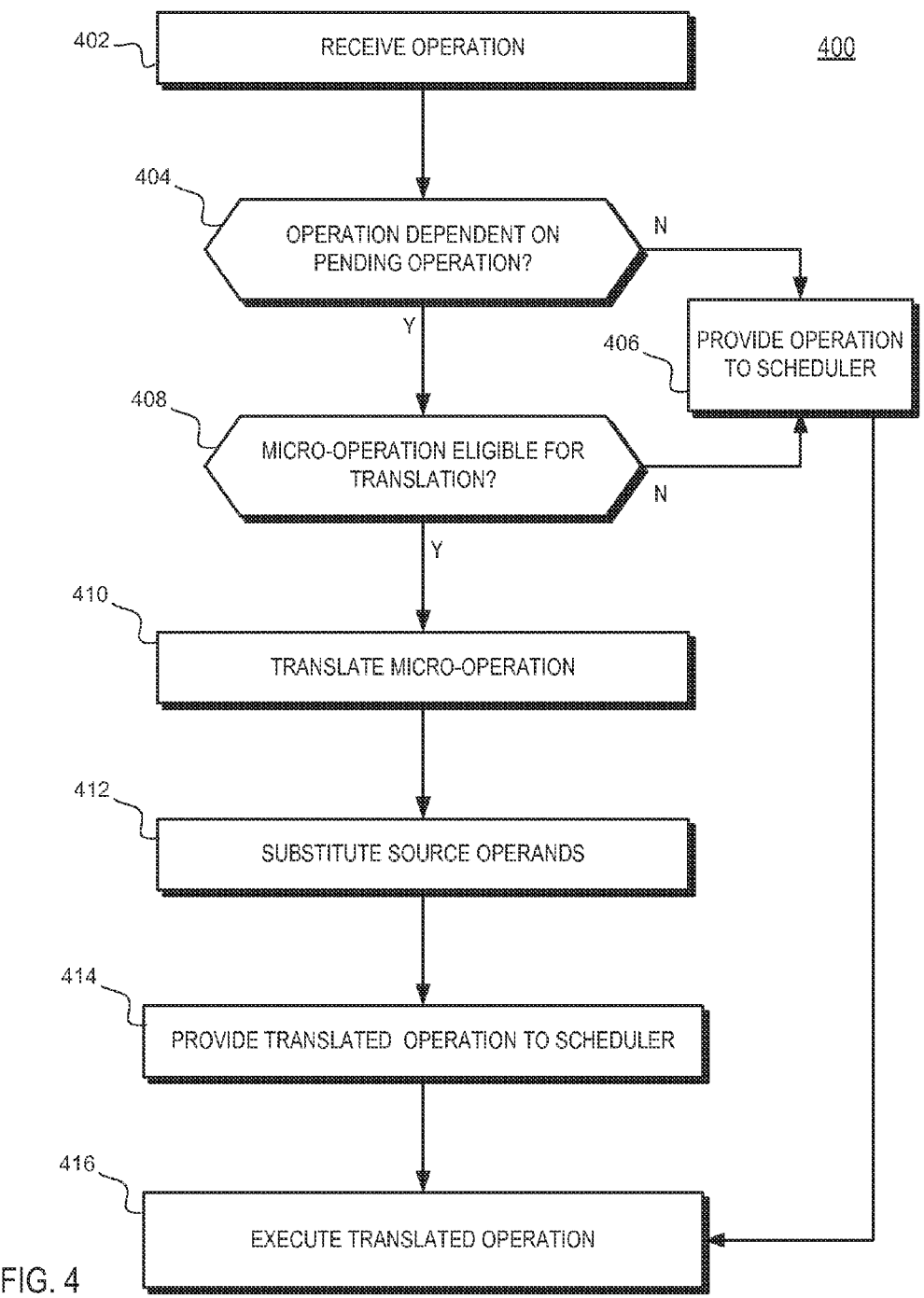
FIG. 4 is a flow diagram illustrating a method of translating a dependent instruction at a processor in accordance with some embodiments.

FIG. 4 illustrates a flow diagram of a method 400 of a method of translating a dependent instruction at a processor in accordance with some embodiments. For ease of explanation, the method 400 is described with respect to an example implementation at the processor 100 of FIG. 1. At block 402 the mapper 105 receives an operation from the front end 102. At block 404 the mapper 105 determines if the received operation is dependent on another pending operation by examining the respective source and destination operands of the received operation and the pending operation. If the received operation is not dependent on a pending operation, the method flow moves to block 406 and the mapper 105 provides the received operation to the scheduler 106.

Returning to block 404, if the mapper 105 determines that the received operation is dependent on a pending operation, the method flow proceeds to block 408, where the mapper 105 determines whether the micro-operation of the received operation indicates that the received operation is eligible for translation. In some embodiments, this determination is made based both on the micro-operation of the received operation and on the micro-operation of the operation from which it depends. If the determination indicates that the received operation is not eligible for translation, the method flow moves to block 406 and the mapper 105 provides the received operation to the scheduler 106. At block 416 the scheduler 106 schedules the translated operation for execution at the execution units 108.

If the determination at block 408 indicates that the received operation is eligible for translation, the method flow moves to block 410 and the mapper 105 substitutes the micro-operation of the received operation with a new micro-operation. The new micro-operation performs a similar function as the replaced micro-operation, but removes the dependency of the received operation. The method flow proceeds to block 412, and the mapper 105 substitutes the source operands of the received operation by replacing a subset of the source operands with the source operands of the operation from which the received operation depends. The mapper 105 also adds additional operands so that the translated operation includes all of the source operands of the operation from which the received operation depends. The destination operand of the received operation is not replaced, so that the translated operation has the same destination operand as the received operation. Accordingly, the translated operation achieves the same result as the received operation but does not depend from a pending operation. Therefore, at block 414 the mapper 105 provides the translated operation to the scheduler 106. At block 416 the scheduler 106 schedules the translated operation for execution at the execution units 108 so that it is executed before or concurrent with the operation from which the received operation depends. Thus, by translating the received operation such that it is no longer dependent on a pending operation, processing latency is reduced and performance is enhanced.

In some embodiments, at least some of the functionality described above may be implemented by one or more processors executing one or more software programs tangibly stored at a computer readable medium, and whereby the one or more software programs comprise instructions that, when executed, manipulate the one or more processor cores to perform one or more of the functions described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 5:
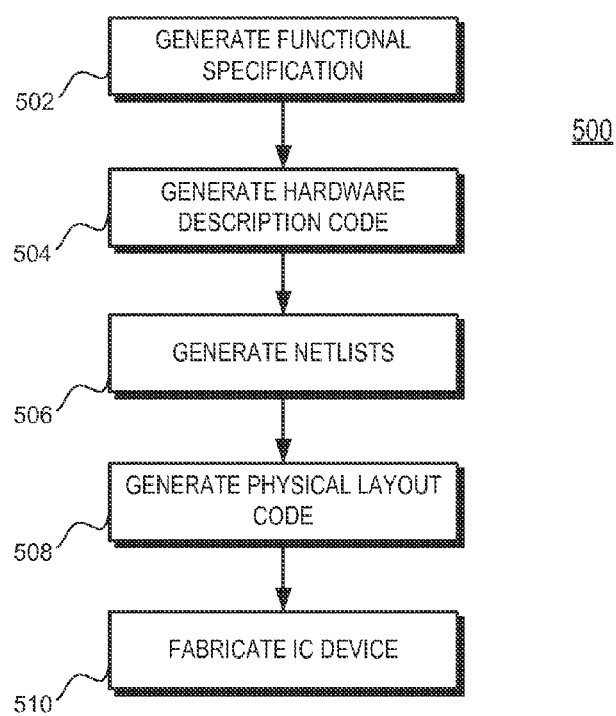
FIG. 5 is a flow diagram illustrating a method for designing and fabricating an integrated circuit device implementing at least a portion of a component of a processing device in accordance with some embodiments.

FIG. 5 is a flow diagram illustrating an example method 500 for the design and fabrication of an IC device implementing one or more aspects. The code generated for each of the following processes is stored or otherwise embodied in computer readable storage media for access and use by the corresponding design tool or fabrication tool.

At block 502 a functional specification for the IC device is generated. The functional specification (often referred to as a micro architecture specification (MAS)) may be represented by any of a variety of programming languages or modeling languages, including C, C++, SystemC, Simulink, or MATLAB.

At block 504, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 506 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 508, one or more EDA tools use the netlists produced at block 906 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 510, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the disclosed embodiments as set forth in the claims below. Accordingly, the specification and figures are to be regarded in an illustrative rather than a restrictive sense, and all such modifications are intended to be included within the scope of the disclosed embodiments.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
    decoding received instructions at an instruction pipeline into a plurality of operations including a first operation and a second operation;
    in response to determining the first operation of the plurality of operations is dependent on the second operation, translating the first operation to a third operation, the third operation independent of the second operation; and
    executing the third operation without waiting for execution of the second operation.

2. The method of claim 1, wherein translating the first operation comprises substituting a first micro-operation of the first operation with a second micro-operation.

3. The method of claim 1, wherein translating the first operation comprises replacing a first source operand of the first operation with a first source operand of the second operation.

4. The method of claim 3, wherein translating the first operation comprises adding a second source operand of the second operation as it second source operand of the third operation.

5. The method of claim 4, wherein translating the first operation comprises setting, a source operand of the first operation as a third source operand of the third operation.

6. The method of claim 5, wherein translating, the first operation comprises setting a destination operand of the first operation as a destination operand of the third operation.

7. The method of claim 1, wherein the first operation and the second operation represent add instructions of a first type that add a first number of addends and the third operation represents an add instruction of a second type that adds a second number of addends.

8. The method of claim 1, wherein the first operation represents an add instruction, the second operation represents a multiply instruction, and the third operation represents a multiply accumulate instruction.

9. The method of claim 1, wherein the first operation is a logical operation.

10. A method, comprising:
    decoding instructions at an instruction pipeline of a processor to determine a first operation and a second operation; and
    in response to determining the second operation is dependent on the first operation:
        translating the second operation to a third operation; and
        scheduling the third operation for execution prior to or concurrent with execution of the first operation.

11. The method of claim 10, where the second operation an integer add operation that adds a first number of addends and the third operation, when executed, adds a second number of addends greater than the first number of addends.

12. The method of claim 10, where the first operation is a floating point multiply operation, the second operation is a floating point add instruction and the third operation, when executed, performs a multiply-accumulate operation.

13. The method of claim 10, wherein the third operation includes the source operands of the first operation and at least one of the source operands of the second operation.

* * * * *